US006816472B1

United States Patent
Dillon et al.

(10) Patent No.: US 6,816,472 B1
(45) Date of Patent: Nov. 9, 2004

(54) METHOD AND APPARATUS FOR SELECTING A BEST LINK FOR SUPPLEMENTAL CHANNEL ASSIGNMENT DURING A HANDOFF PERIOD IN A SPREAD SPECTRUM COMMUNICATION SYSTEM

(75) Inventors: Matthew J. Dillon, Boulder, CO (US); Bogdan R. Nedelcu, North Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 482 days.

(21) Appl. No.: 09/616,501

(22) Filed: Jul. 14, 2000

(51) Int. Cl.[7] .............................................. H04Q 7/00
(52) U.S. Cl. ...................... 370/331; 370/332; 455/436; 455/442
(58) Field of Search ................................. 370/331, 320, 370/335, 338, 342, 441, 447, 332; 455/436, 442, 450

(56) References Cited

U.S. PATENT DOCUMENTS

| | | | | |
|---|---|---|---|---|
| 5,923,650 A | * | 7/1999 | Chen et al. ................. | 370/331 |
| 5,987,326 A | * | 11/1999 | Tiedemann, Jr. et al. ... | 455/442 |
| 6,002,933 A | * | 12/1999 | Bender et al. .............. | 455/442 |
| 6,574,483 B1 | * | 6/2003 | Amerga ...................... | 455/517 |
| 6,590,879 B1 | * | 7/2003 | Huang et al. ............... | 370/331 |

FOREIGN PATENT DOCUMENTS

EP          1059739      * 12/2000

* cited by examiner

Primary Examiner—Ajit Patel
Assistant Examiner—Steven A Blount
(74) Attorney, Agent, or Firm—James A. Lamb; Scott M. Garrett

(57) ABSTRACT

A technique is used in a spread spectrum communication system (100) such as cdma2000 or UMTS to assign a subscriber unit (120) a link for a supplemental channel, during a handoff period. The technique includes queuing a data packet for transmission to the subscriber unit at a packet transmission time (221) determined by a queue delay (220), obtaining pilot signal strength measurements of at least two active downlinks (125) of the subscriber unit that are measured substantially at the packet transmission time, and determining a strongest one of the at least two active downlinks from the pilot signal strength measurements. The pilot signal strength measurements are obtained by determining a pilot signal measurement time (PSMT) for the subscriber unit, calculating a pilot signal measurement delay (PSMD) from the PSMT and the queue delay, and transmitting a pilot signal measurement request (PSMRQ) to the subscriber unit after the PSMD.

11 Claims, 3 Drawing Sheets

METHOD AND APPARATUS FOR SELECTING A BEST LINK FOR SUPPLEMENTAL CHANNEL ASSIGNMENT DURING A HANDOFF PERIOD IN A SPREAD SPECTRUM COMMUNICATION SYSTEM

FIELD OF THE INVENTION

This invention relates in general to spread spectrum communication systems, and in particular to a method and apparatus for assigning an optimum link for data packet transmission in a supplemental channel (of a CDMA 2000 system) or a downlink shared channel (in a UMTS system) during soft handoff in a spread spectrum system.

BACKGROUND OF THE INVENTION

Communication systems are well known and consist of many types including land mobile radio, cellular radiotelephone, personal communication systems, and other communication system types. Within a communication system, transmissions are conducted between a transmitting device and a receiving device over a communication resource, commonly referred to as a communication channel. Transmissions used to consist primarily of voice signals and low speed data signals. More recently, however, it has proposed to use radio communication systems for high-speed data signals. For ease of operation, it is preferable to have the data transmission capability overlay the existing voice communication capability, such that its operation is essentially transparent to the voice communication system while still utilizing the communication resources and other infrastructure of the voice communication system.

Two such communication systems currently being developed with transparent data transmission capabilities are spread spectrum communication systems known as the next generation Code-Division Multiple Access (CDMA) cellular communication system, or cdma2000, and the next generation Global System for Mobile Communications (GSM), or Universal Mobile Telephone System (UMTS). Within these well known spread spectrum communication systems, all subscriber unit transmissions occur simultaneously within a frequency band, and all base station transmissions occur simultaneously within a frequency band. Therefore, a received signal at a base station or a subscriber unit comprises a multiplicity of frequency and time overlapped coded signals form individual subscriber units or base station units, respectively. Each of these signals is transmitted simultaneously at the same radio frequency (RF) and is distinguishable only by its specific encoding (channel).

Within spread spectrum communication systems, a subscriber is typically assigned at least one link that is used to communicate information between the communication system and the subscriber unit. Each link comprises channels that are assigned to communicate information between the subscriber unit and a (geographic) sector of a base transmitter site. Every link includes one channel called a pilot signal that is used for several purposes, including setting up and monitoring the signal strength of the link. The link can also comprise what is named herein a "fundamental channel" that is dedicated only to one subscriber unit during the duration of a voice call and is used to transfer voice information between the subscriber unit and the communication system. The fundamental channel as named herein is called a fundamental channel in the cdma200 communication system but is called a dedicated channel in the UMTS communication system. The link can also comprise what is called herein a supplemental channel that is assigned to a subscriber unit to transfer high-speed digital information between a subscriber unit and the communication system, but the assignment lasts only as, long as needed to accomplish the transfer of the data. The supplemental channel as named herein is called a supplemental channel in the cdma200 communication system but is called a shared channel in the UMTA communication system. Although the supplemental channel of the cdma2000 and the shared channel of the UMTS system have some quite different characteristics, they also share some common characteristics. The same is true for the fundamental channel of the cdma2000 system and the dedicated channel of the UMTS system.

At some times during which a subscriber unit is being used in the communication system, only one link is assigned to the subscriber unit, because the strength of the link from the base transmitter site to the subscriber unit (the downlink) has been determined to be sufficient to provide consistent high quality service. However, at other times, the subscriber is located within the communication system at a point where no single downlink can provide consistent high quality service, but lower quality downlinks are possible to more than base transmitter site sectors. Both conditions can occur at different times during one voice call. A unique aspect of spread spectrum communication systems is that the use of the spread spectrum modulation and coding technique allows a combining of the multiple received signals that carry the same information. The combining adds together the signal strengths of the individual signals, and in many instances is capable of providing a high quality received signal from the several downlinks. This combining is typically used in spread spectrum communication systems for the fundamental channels (the voice channels) until one of the downlinks becomes strong enough to provide high quality service by itself, at which time all other links are dropped. The combining is, however, not allowed for the supplemental channels, because they occupy a substantial portion of the RF resources, in terms of power and bandwidth, and because they are typically very short compared to voice calls. The period of time during which the combining takes place is called the "soft handoff period" or "handoff period" and the operation is called the "handoff" by those of ordinary skill in the art, because it commonly occurs when a new single link is assigned and an old link is dropped. The terms "soft handoff period" and "handoff period" are also used herein for the time period during which a fundamental channel would operate in the combining mode but is not assigned to the subscriber unit (for example, because there is no voice call occurring). During a handoff period, the links that are assigned or would be assigned to a subscriber unit for combining are called the active links.

When a subscriber unit is not in operating during a handoff period, a supplemental channel is assigned to the same link as the pilot channel, and the quality of service for the supplemental channel is will be satisfactory. However, during a handoff, there is a problem in accurately determining a best downlink for transmission of a data packet using a supplemental channel because of a combination of factors: the shortness of typical data packets, an uncertainty as to when the data packet will be transmitted due to system queuing delays, and the difficulty of knowing the signal strength of the active links at them moment the data packet is transmitted.

Thus, what is needed is a technique for selecting a best link for supplemental channel assignment during a handoff period in a spread spectrum system.

BRIEF DESCRIPTION OF THE DRAWINGS

The features of the invention believed to be novel are set forth with particularity in the appended claims. The invention itself, however, may be best understood by reference to the following detailed description of the invention, which describes certain exemplary embodiments of the invention, taken in conjunction with the accompanying drawings, in which:

DESCRIPTION OF THE PREFERRED EMBODIMENT

Figure 1:
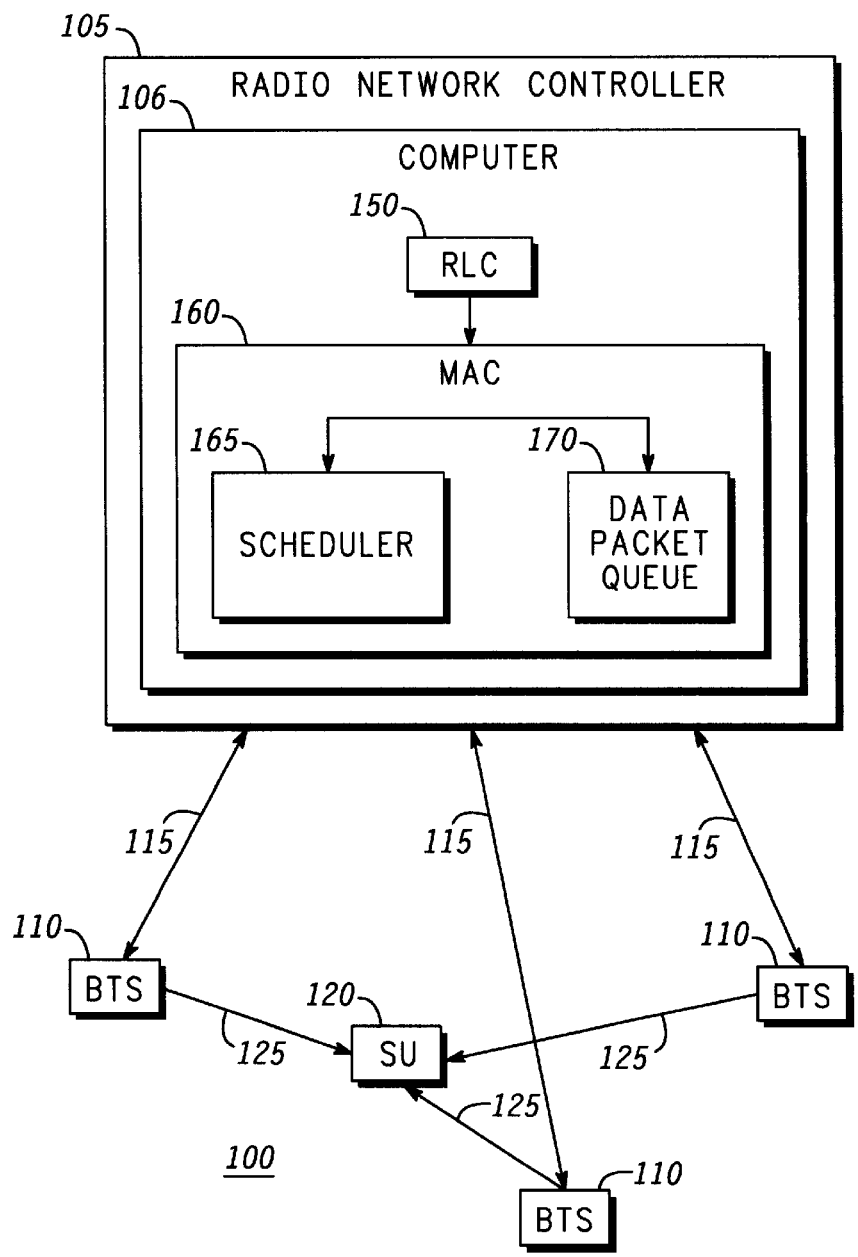
FIG. 1 shows a block diagram of a portion of a spread spectrum communication system, in accordance with the preferred embodiment of the present invention.

The definitions of terms used herein below are identical to those set forth above. While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. Further, the terms and words used herein are not to be considered limiting, but rather merely descriptive. In the description below, like reference numbers are used to describe the same, similar, or corresponding parts in the several views of the drawings.

In general, one aspect of the present invention is a technique used during a handoff period in a spread spectrum communication system to assign a subscriber unit a link for a supplemental channel. The technique includes queuing a data packet for transmission to the subscriber unit at a packet transmission time determined by a queue delay, obtaining pilot signal strength measurements of at least two active downlinks of the subscriber unit that are measured substantially at the packet transmission time, and determining a strongest one of the at least two active downlinks from the pilot signal strength measurements. The link that includes the strongest downlink is then assigned to carry the supplemental channel.

Referring now to the drawings and in particular to FIG. 1, a block diagram of a portion of a spread spectrum communication system 100 is shown, in accordance with the preferred embodiment of the present invention. The spread spectrum communication system 100 comprises a radio network controller (RNC) 105 that is coupled to a plurality of base transmitter sites 110, of which three are shown in FIG. 1, by conventional fixed network links 115 that can include, for example, broadband cable and optical cable. The base station sites 115 include base station radio transmitters (not shown separately in FIG. 1) that transmit information on assigned channels of the spread spectrum communication system, the RF energy being radiated within one or more predetermined geographic sectors of each base station transmitter, as is well known to one of ordinary skill in the art. The spread spectrum communication system 100 also comprises a plurality of subscriber units 120, of which one is shown in FIG. 1. The subscriber units 120 are conventional cellular telephones. The subscriber unit 120 shown in FIG. 1 is illustrated in a handoff wherein it is assigned three active links 125 for a voice call on a fundamental channel.

Figure 2:
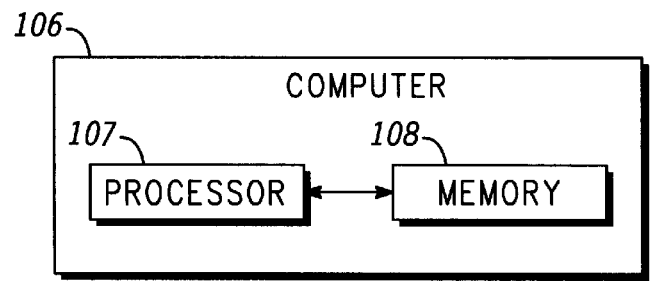
FIG. 2 shows a block diagram of a computer used in a radio network controller of the spread spectrum communication system shown in FIG. 1, in accordance with the preferred embodiment of the present invention.

The RNC 105 comprises a computer 106 that performs a plurality of functions including, but not limited to, a radio link control function (RLC) 150 and a medium access control function (MAC) 160. It will be appreciated that the computer 106 comprises a processor 107 and a memory portion (memory) 108, as shown in FIG. 2, and that the functions performed by the computer 106 are performed by the processor 106 executing programmed instructions that are stored in the memory 109. The memory 109 also stores data that is used in the performance of the functions. The processor 107 and memory 108 are conventional computer hardware assemblies. The processor comprises a central processing unit and can comprise other conventional hardware components as parallel input-output buffers, digital-to-analog and analog-to-digital converters, and serial data input-output lines. The memory comprises conventional combinations of such things as read only memory, random memory, and disk memory. The set of programming instructions and the organization of the data stored in the memory 108 are uniquely designed to perform the unique functions described herein.

The MAC 160 comprises a scheduling function (scheduler) 165 and a data packet queuing function (data packet queue) 170. Data packets are received at or generated by the RLC 150 for delivery to subscriber units. For example, a data packet carrying a portion of a web page that has been delivered to the RNC 105 from the World Wide Web is received by the RLC 150 for delivery to the subscriber unit 120. The RNC 105 hands the data packet off to the MAC 160. The scheduler 165 determines which link is to be assigned to the subscriber unit 120 for transmission of the data packet (i.e., at which base transmitter site 110 a link having a supplemental channel is to be assigned), and transfers the data packet to the data packet queue 170 for transmission after all data packets of the same priority have been transmitted.

It will be appreciated that portions of the MAC 160 can alternatively reside in the BTSs 110, although the portions described in detail herein are preferably performed in the RNC 105.

Figure 3:
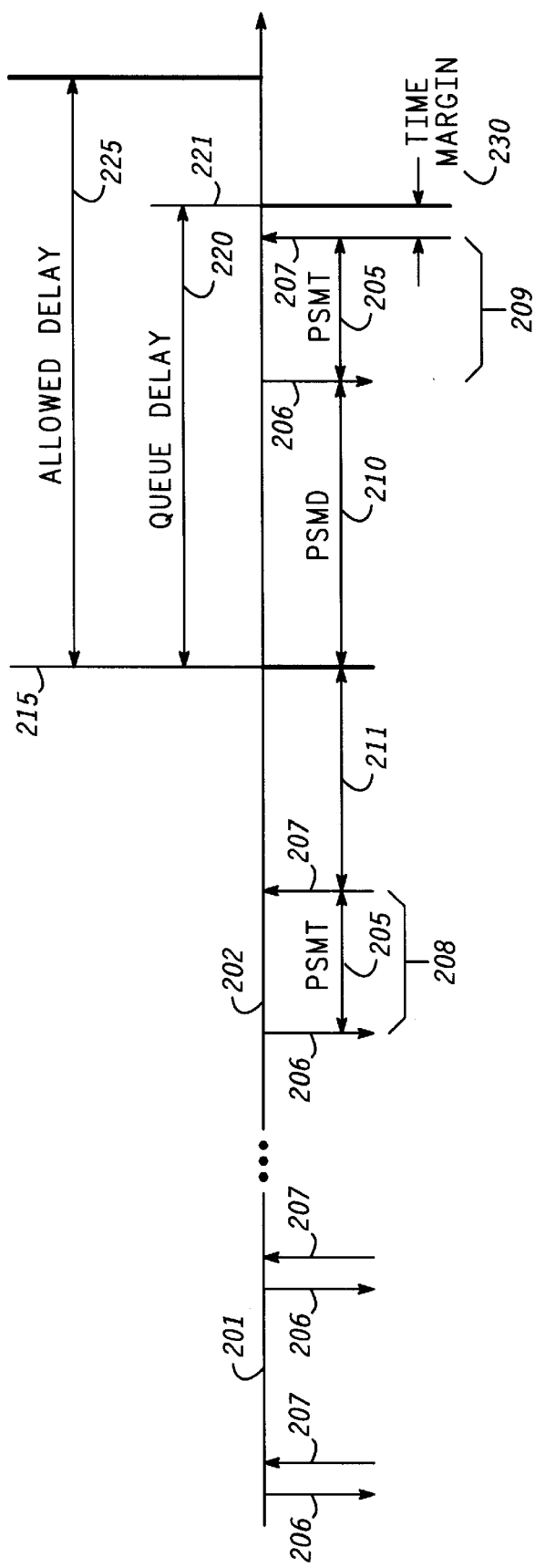
FIG. 3 is a timing diagram of pilot signal measurement messages, in accordance with the preferred embodiment of the present invention.

Referring now to FIG. 3, a timing diagram of pilot signal measurement messages is shown, in accordance with the preferred embodiment of the present invention. During normal operation of the spread spectrum communication system 100, pilot signal strength measurements (PSSMs) are made by the subscriber unit 120 at various times as directed by the radio network controller 106 or the base transmitter site 110. These PSMs can be made using functions that are conventional functions of the spread spectrum communication system 100 or they can be using the unique functions-described herein that are performed in accordance with the preferred embodiment of the present invention. The PSSMs are initiated by a pilot signal measurement request (PSMRQ) 206, which is a predetermined command. After receiving the PSMRQ 206, the subscriber unit 120 measures the pilot signal strength for all active downlinks, the subscriber unit transmits a pilot signal measurement response (PSMRS) 207, which is a data packet that includes the PSMs. Several pairs of these PSMRQs 206 and PSMRSs 207 are shown at the left side of FIG. 3, using a first time scale 201. On a second time scale 202, which is a less compressed time scale than the first time scale 201, two other pairs 208, 209 of these PSMRQs 206 and PSMRSs 207 are shown. The time between a PSMRQ 206 and a corresponding PSMRS 207, which is called herein the pilot signal measurement time (PSMT) 205, tends to be approximately the same for any two pairs that occur sufficiently close together in time. A typical value for the PSMT is 150 milliseconds. Another way to say this is that the correlation of a PSSM to actual signal strengths at a later time is high only for a period of time, typically 1000 to 2000 milliseconds. When the RLC 150 transfers a data packet to the MAC 160 during a handover period (this occurrence is shown as time 215 in FIG. 3), the scheduler 165 determines a queue delay 220, a packet transmission time 221, and a last PSMRS time 211 for the data packet. The queue delay 220 is the delay (from time 215 to the transmission time 221) that the data packet will experience if it is placed in the data packet queue 170 before another data packet is placed in or transmitted from the data packet queue 170. The last PSMRS time 211 is the duration from the last PSMRS 207 to the time 215 when the data packet is received. According to the details described herein below, a PSMRQ 206 is then transmitted, under certain conditions, by the base transmitter sites 120 on the fundamental channels of the active links currently assigned to the subscriber unit 120 (or the active links that would be assigned if there were a voice call in process). This transmission of the PSMRQ 206 occurs after a pilot signal measurement delay (PSMD) 210. The subscriber unit 120 transmits the PSMRS 207 prior to the queue delay by a duration that is approximately equal to a time margin 230, which is described below. An allowed delay 225 is also shown in FIG. 3 that represents a maximum amount of delay that is allowed for a data packet intended for the subscriber unit 120, corresponding to a grade of service that is assigned to the subscriber unit 120.

Figure 4:
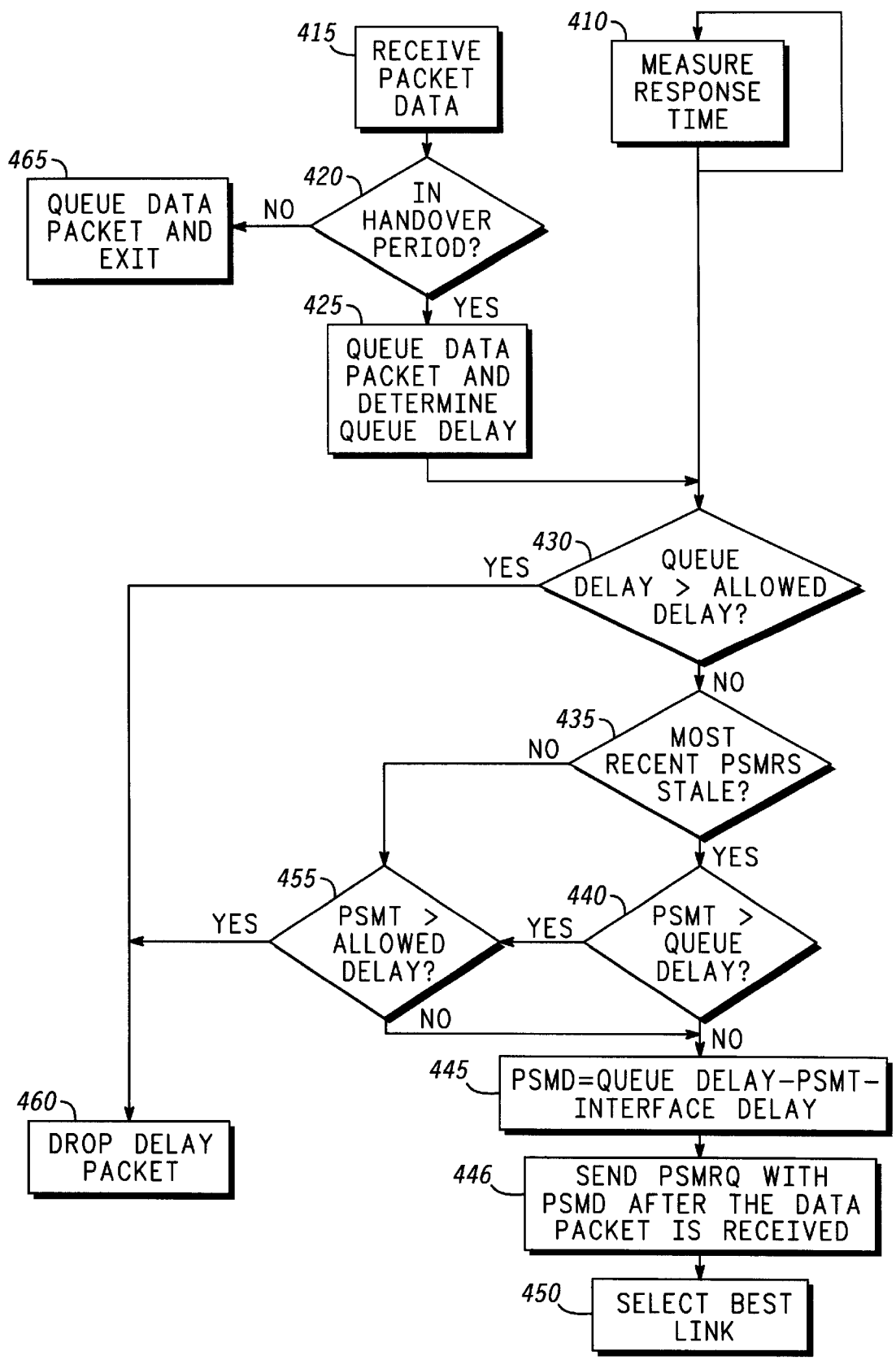
FIG. 4 is a flow chart of a method used in the computer of the spread spectrum communication system, in accordance with the preferred embodiment of the present invention.

Referring now to FIG. 4, a flow chart of a method used in the computer 106 of the spread spectrum communication system 100 is shown, in accordance with the preferred embodiment of the present invention. At step 410, the RNC 105 accepts PSMs as they are received from any active subscriber units and uses those from the subscriber unit 120 to update an estimated PSMT 205 for each link in active use by the subscriber unit 120. An update time is also recorded, which is the time at which the most recent PSMRS 107 was received. The updated estimate is a weighted estimate that creates a weighted average of the most recent PSSM and other older PSSMs, with the older PSMs given more diminished weights the older they are. Other well-known weighting methods could be alternatively used. At step 415, a data packet is received or generated by the RLC 150, and transferred to the MAC 160. The scheduler 165 determines whether the subscriber unit 120 is in a handoff. If the subscriber unit 120 is not in a handoff period, the scheduler 165 queues the message in the data packet queue 170 and exits this function at step 465. If the subscriber unit 120 is in a handoff period, the scheduler 165 queues the message in the data packet queue 170 and determines the queue delay 220 (FIG. 3). Then at step 430 the scheduler 165 compares the queue delay 220 to the allowed delay 225 and when it is not greater than the allowed delay 225, which is the typical situation in a communication system that is performing normally, the scheduler 165 determines whether the most recent PSSM is stale. This is done by comparing the last PSMRS time 211 to a predetermined stale time. As indicated above, because a past PSSM correlates well to the actual present pilot signal strengths only within a limited time, the predetermined stale time is chosen to ensure that the correlation of the most recent PSSM is good. When the last PSMRS time 211 is greater than the stale time, the particular PSMRS 207 and the PSSM associated with it are deemed to be stale. In this case, which occurs fairly often, the scheduler 165 then determines whether the PSMT is greater than the queue delay. This will normally not be the case, in response to which the scheduler 165 determines the PSMD 210 at step 445 by subtracting the estimated PSMT 205 and the time margin 230 from the queue delay, and causes a PSMRQ 206 to be transmitted to the subscriber unit at step 446 at a delay time after the data packet—is received at time 215, for which the delay time is the PSMD 210 just calculated. It can be seen that this unique method of transmitting a PSMRQ 206 after a data packet is received results in a PSMRS 207 being received before the time at which the data packet is to be transmitted by the amount of time margin 230. The time margin 230 is a period during which the computer 106 makes a selection of a best downlink from the active links 125 an accomplishes a set-up of a supplemental channel on the link having the best downlink to use for the transmission of the data packet, at step 450. The selection is made using the pilot signal measurements obtained just before the transmission of the data packet, using conventional methods of determining at the best downlink from the measurements.

When at step 430 the queue delay 220 is determined to be greater than the allowed delay 225, the data packet is dropped from the data packet queue at step 460. When the most recent PSMRS 207 is determined to be not stale at step 435 and the PSMT 205 is greater than the allowed delay 225 at step 455, the data packet is dropped from the data packet queue at step 460. When the most recent PSMRS 207 is determined to be stale at step 435 and the PSMT 205 is determined to be greater than the queue delay 220 at step 440 and the allowed delay 225 at step 455, the data packet is dropped from the data packet queue at step 460.

It will be appreciated that some of the steps of the flow chart described with reference to FIG. 4 can be performed in a different order than described and the same results can be accomplished by different steps. For example, steps performed in a different order could accomplish the logical results produced by steps 430, 435, 440, and 455.

While the preferred and other embodiments of the invention have been illustrated and described, it will be clear that the invention is not so limited. Numerous modifications, changes, variations, substitutions, and equivalents will occur to those of ordinary skill in the art without departing from the spirit and scope of the present invention as defined by the following claims.

We claim:

1. In a spread spectrum communication system, a method used during a handoff period to assign a subscriber unit a supplemental channel, comprising the steps of:

queuing a data packet for transmission to the subscriber unit at a packet transmission time determined by a queue delay;

obtaining pilot signal strength measurements of at least two active downlinks of the subscriber unit that are measured substantially at the packet transmission time, comprising:

determining a pilot signal measurement time (PSMT) for the subscriber unit;

calculating a pilot signal measurement delay (PSMD) from the PSMT and the queue delay; and transmitting a pilot signal measurement request (PSMRQ) to the subscriber unit after the PSMD; and determining a strongest one of the at least two active downlinks from the pilot signal strength measurements.

2. The method according to claim 1, further comprising the step of assigning to the subscriber unit the supplemental channel of the active link that includes the strongest one of the at least two active downlinks.

3. The method according to claim 2, wherein the pilot signal measurement delay (PSMD) is further based on an time margin and is determined as:

PSMD=queue delay−PSMT−time margin.

4. The method according to claim 1, wherein at least one of the steps of queuing, obtaining, and determining are performed by a radio network controller of the communication system.

5. The method according to claim 1, wherein at least one of the steps of queuing, obtaining, and determining are performed by a base transmitter site.

6. The method according to claim 1, further comprising the step of:
dropping the data packet from the queue when the queue delay is greater than an allowed delay.

7. The method according to claim 2, further comprising the step of:
dropping the data packet from the queue when a most recent pilot signal measurement response (PSMRS) is not stale and the PSMT is greater than an allowed delay.

8. The method according to claim 2, further comprising the step of:
dropping the data packet from the queue when a most recent pilot signal measurement response (PSMRS) is stale and the PSMT is greater than the queue delay and greater than an allowed delay.

9. A computer for a spread spectrum communication system that assigns a supplemental channel to a subscriber unit during a handoff period, comprising:
a central processing unit for executing programmed instructions; and
a memory that stores the programmed instructions and data packets, wherein the programmed instructions control the processor to perform a function that
queues a data packet for transmission to the subscriber unit at a packet transmission time determined by a queue delay,
obtains pilot signal strength measurements of at least two active downlinks of the subscriber unit that are measured substantially at the packet transmission time by
determining a pilot signal measurement time (PSMT) for the subscriber unit;
calculating a pilot signal measurement delay (PSMD) from the PSMT and the queue delay; and
transmitting a pilot signal measurement request (PSMRQ) to the subscriber unit after the PSMD, and
determines a strongest one of the at least two active downlinks from the pilot signal strength measurements.

10. The computer according to claim 9, wherein the computer is within a radio network controller and the function is a medium access control function.

11. The computer according to claim 9, wherein the computer is within a base transmitter site.

* * * * *